UNITED STATES PATENT OFFICE.

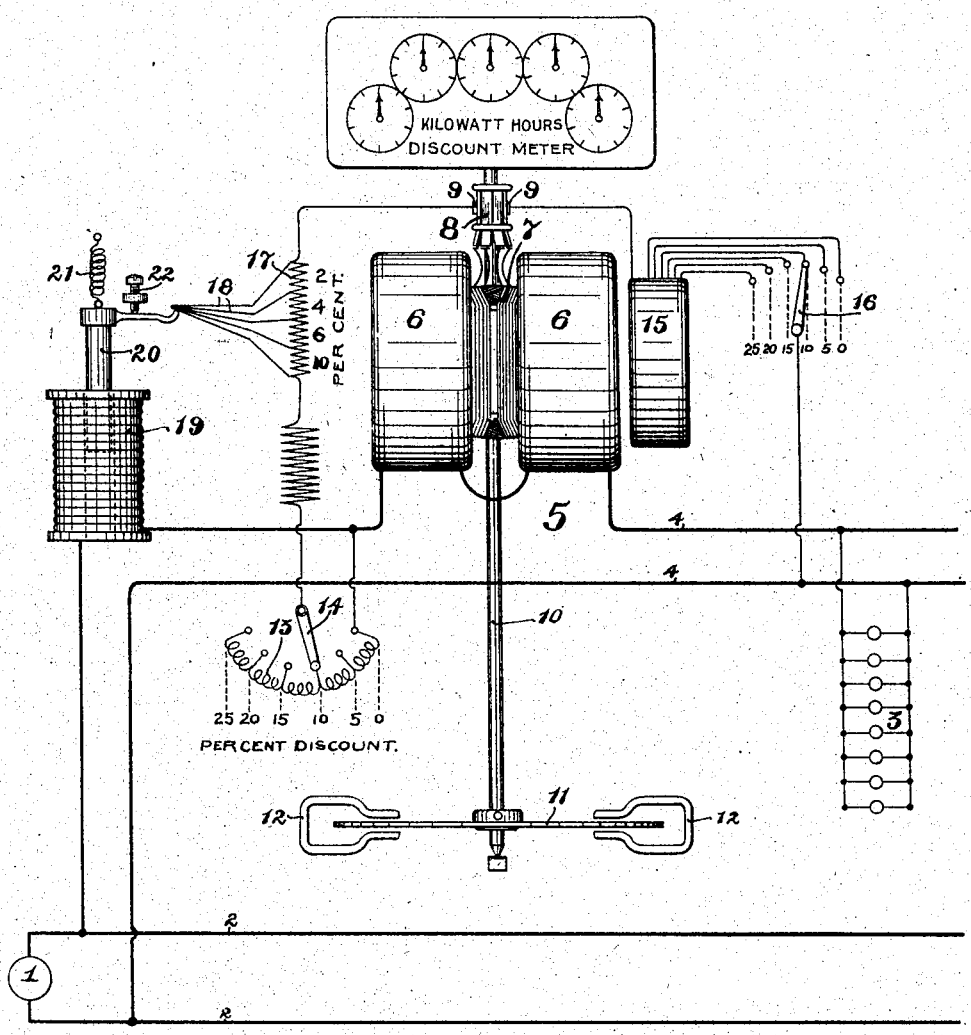

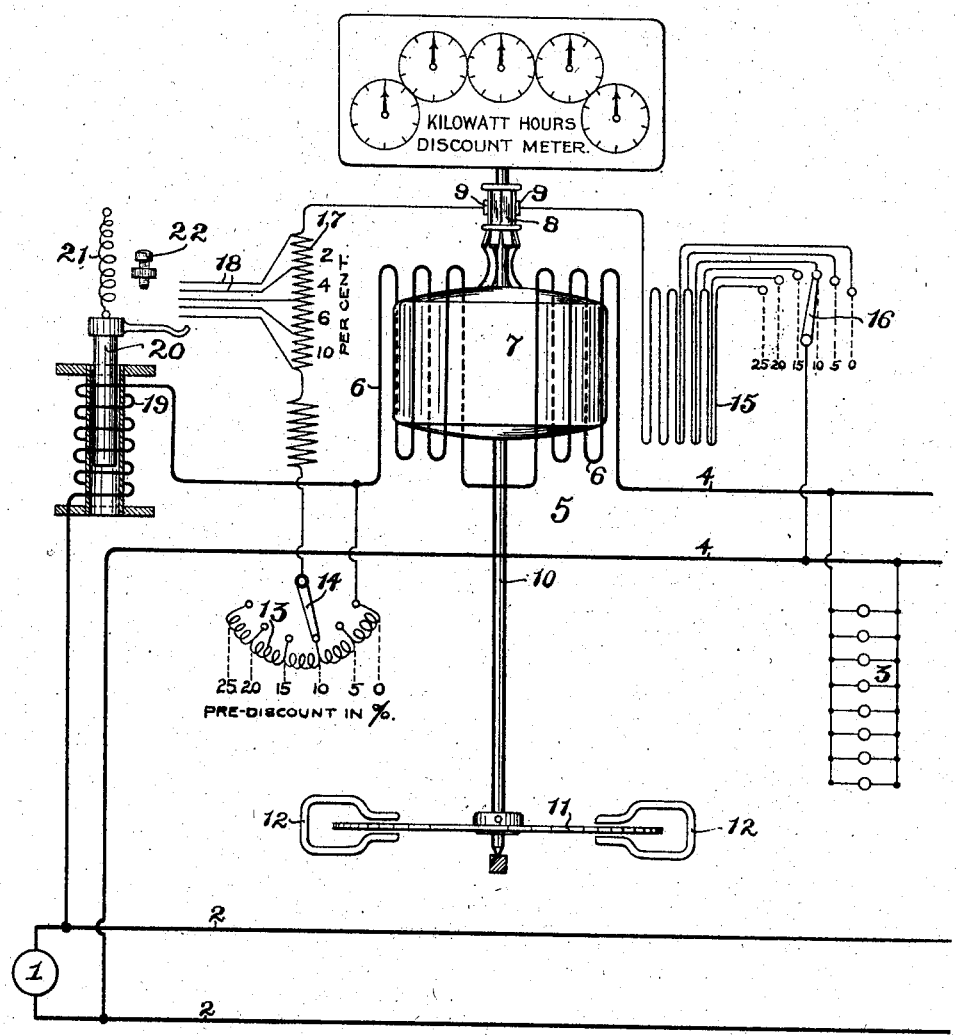

THOMAS DUNCAN, OF CHICAGO, ILLINOIS, ASSIGNOR TO DUNCAN ELECTRIC MANUFACTURING COMPANY, OF LAFAYETTE, INDIANA.

ELECTRIC METER.

No. 796,038.     Specification of Letters Patent.     Patented Aug. 1, 1905.

Application filed July 11, 1901. Serial No. 67,814.

*To all whom it may concern:*

Be it known that I, THOMAS DUNCAN, a citizen of the United States, residing at Chicago, in the county of Cook and State of Illinois, have invented a certain new and useful Improvement in Electric Meters, of which the following is a full, clear, concise, and exact description, reference being had to the accompanying drawings, forming a part of this specification.

My invention relates to electric meters for measuring the load or energy in systems of electrical distribution, and has as its salient features, first, the provision of two coöperating step-by-step adjusting means for governing the torque in the meter by the introduction of resistance and varying the number of effective turns in a meter-winding, whereby the rate of operation of the meter for a given load may be varied so that the meter may be caused to totalize at a rate according to the price agreed upon with the consumer; second, the provision of automatically-operated means for governing the operation of the meter to decrease the rate of operation thereof as the load in the system increases, so that the consumer may have the benefit of a sliding discount, the discount increasing with the increase in current consumption.

That feature of my present invention employing two means for preadjusting a fixed discount is of particular utility in connection with meters employing an auxiliary field-winding that acts to create a starting torque useful in assisting the meter on light loads and in overcoming friction. One of the said adjusting means comprises, preferably, a rheostat that may be placed in series with the armature where a commutated motor-meter is employed, the starting field-winding being also in series with the armature. By increasing this resistance the torque between the armature and the field portions of the meter is reduced to correspondingly reduce the rate of operation of the measuring mechanism, so that the meter may register the kilowatt-hours the consumer is to be charged for, the counting-train of the instrument not necessarily indicating the exact energy or load, as the reading indicates the total actual power consumed less the prearranged discount. For example, these adjusting resistances may by their step-by-step adjustment provide for five, ten, fifteen, twenty, and twenty-five per cent. discount. One consumer may not be given any discount. His meter will then indicate the true reading in kilowatt-hours of the energy consumed. Another consumer may be given five per cent. discount. Supposing that he has consumed one thousand kilowatt-hours, his instrument will indicate a charge for nine hundred and fifty kilowatt-hours. Another consumer who uses ten thousand or more kilowatt-hours may be given ten per cent. discount, and for ten thousand kilowatt-hours consumed his meter will indicate a charge for nine thousand kilowatt-hours. By this arrangement the keeping of accounts is greatly simplified, as the consumers are charged according to the readings of their meters, each instrument then taking cognizance of the particular consumer's discount. As the discount is increased the adjusting resistance included in series with the armature and the starting field-winding is also increased, whereby the volume of current through the starting field-winding is decreased. To maintain a given field strength produced by the starting field-winding, I provide means whereby additional turns thereof are included in circuit as additional sections of the said adjusting resistance are included in circuit, so that the increased number of turns in the field-winding compensates for the decreased volume of the current flowing through the same.

That feature of my invention which relates to the automatic change in the rate of speed of the meter is employed where the consumers are given a fluctuating discount in addition to the fixed predetermined discount, whereby the rate of operation of the counting-train per unit of load or energy is decreased as the consumption of current increases. This feature of the invention is preferably practiced by including a second discount-adjusting resistance in series with the prediscount-adjusting resistance and the armature-winding, assuming that commutated motor-meters are employed. The second adjusting resistance is provided with means whereby the amount thereof included in series with the armature may be automatically varied. For changing the amount of the fluctuating resistance I preferably provide an electromagnet or solenoid traversed by the main current whose core or armature is adapted to effect engagement between springs constituting the terminals of the various sections of the resistance when the current in the system is within certain predetermined limits, whereby all of this resistance is shunted from the armature. As the current in the system exceeds a certain predetermined maximum, the core or armature is attracted to permit a separation between a number of terminal springs corresponding to the excess in current to introduce a corresponding amount of fluctuating resistance in the armature-circuit, thereby decreasing the torque of the instrument and causing a reduced rate of operation of the measuring mechanism of the instrument per unit of load or energy.

I prefer to employ the means described, which causes a change in the rate of operation of the counting mechanism by an adjustment of the torque of the meter; but I do not wish to be limited to this means for varying the rate of operation of the measuring mechanism, as other instrumentalities may be employed for accomplishing the same result without departing from the spirit of the invention.

I will explain my invention more fully by reference to the accompanying drawings, in which—

Figure 1 illustrates a system of direct-current distribution, the meter being diagrammatically indicated in elevation, the fluctuating discount resistance being excluded from circuit. Fig. 2 is a view similar to Fig. 1, the meter-windings being more diagrammatically illustrated and the fluctuating discount resistance being shown totally included in the armature-circuit.

Like parts are indicated by similar characters of reference in both views.

I have illustrated a system of direct-current distribution and a commutated motor-meter; but the invention is equally applicable to other systems of electrical distribution and to meters of other forms.

In each of the figures a generator 1 is illustrated that supplies current to the transmission-mains 2 2. These mains convey current to translating devices, such as electric lamps 3, that may be connected in circuit with supply-conductors 4 4. A meter 5 is associated with the consumer's supply-circuit 4 4, the meter in this instance employing a field-winding divided into coils 6 6 in series with one of the conductors 4 and an armature 7 in bridge between the mains 4 4, a commutator 8, with brushes 9 9, being provided for including the armature in circuit. The armature is mounted upon a shaft 10, at the lower part of which is a damping-disk 11, arranged within the fields of the permanent magnets 12 12 to secure requisite damping effect.

In order to adjust the torque of the meter to conform to the prearranged cost of the current, I preferably include a resistance 13, that may be termed a "prediscount" resistance, in series with the armature, this resistance being provided with a plurality of discount-buttons that may be suitably marked to indicate various discounts. A switch-arm 14 may be swung into engagement with any of the buttons to include more or less of the resistance 13 in circuit with the armature. If the consumer is to be charged at the highest rate, the circuit conditions may be such that none of the resistance 13 should be included in circuit with the armature, whereby the greatest torque may exist between the armature and field. If the consumer is to receive five per cent. discount, a certain section of the resistance may be included in circuit by swinging the rheostat-arm 14 to the button marked "5." If the consumer is to receive ten per cent. discount, the arm 14 may be swung to the button "10." Thus the torque of the meter may be readily adjusted to cause the meter to indicate a quantity of energy for which a fixed rate may be charged, the indicated quantity of energy being the same as the actual quantity consumed where no fixed discount is allowed and less than the actual energy consumed according to the percentage of discount.

Where a supplemental starting field-winding, such as the winding 15, is included in series with the discount resistance, it is obvious that an increase of the prediscount resistance would reduce the volume of current flowing through the auxiliary field-winding, whereby the field produced by the auxiliary winding is reduced in effect, impairing the efficiency thereof, especially when the meter is to work on light loads. To obviate this difficulty, I provide supplemental turns for the supplemental starting field-winding, which are added to the supplemental field-winding as the prediscount resistance is added, whereby a compensation is effected for a reduction in the volume of current, so that a uniform magnetic field due to the auxiliary winding is maintained.

A switch-arm 16 may be provided to engage with buttons that are marked to indicate the various discounts in a manner corresponding to the marking of the prediscount resistance. For example, if the consumer is to be allowed no discount no resistance 13 is preferably included in circuit, while the switch-arm 16 is thrown to the button that indicates no discount, whereby a minimum quantity of the auxiliary field-winding is included in the circuit. If the consumer is to be allowed five per cent. discount, the switch-arms 14 and 16 are thrown to the corresponding buttons, whereby some of the resistance 13 is included in series with the armature; but at the same time a corresponding increase is effected in the auxiliary winding 15 to compensate for the reduced current flowing through this winding.

To provide a fluctuating discount that may or may not be given in addition to the discount afforded by the resistance 13, I provide means preferably in the form of a torque-adjusting resistance 17, having terminal contact-springs 18. This resistance is preferably included in series with the resistance 13 and the armature, in which case when the current in the system is within the predetermined limits all of the resistance is short-circuited, as illustrated in Fig. 1. When the current in the system is at the maximum, the resistance-terminals 18 are disconnected, whereby the total resistance 17 is included in series with the armature to effect a corresponding reduction of the torque, and thereby cause the measuring mechanism to operate at its slowest speed per unit of energy or load. When the increased current fluctuates, more or less of the resistance-terminals 18 are electrically connected to include more or less of the resistance 17, and thereby effect an adjustment of the torque to produce a rate of speed of the measuring mechanism per unit of energy or load in proportion to the current in the system with the discount taken into consideration. The control of the resistance-terminals 18 is automatically effected, preferably, by means of an electromagnet or solenoid 19, whose armature or core 20 is provided with a spring 21, that holds the armature against the back-stop 22 during the time that the current in the system is within the limits that entitle the consumer to no sliding discount. This adjustment is illustrated in Fig. 1, all of the resistance 17 being shunted out of circuit by the electrical contact of all the springs 18, which are thrust together by means of the armature 20 or an extension thereof. The winding of the magnet is preferably included in series with one of the main conductors 4.

When there is that current in the system for which the consumer is entitled to the greatest sliding discount, the solenoid-core is fully attracted by its helix, the armature then being withdrawn from engagement with the resistance-terminals 18, which thereupon separate and include the total resistance in circuit with the armature to produce the slowest rate of operation of the measuring mechanism per unit of load or energy.

I have illustrated the resistance 17 as being designed to effect a sliding rate of discount of two, four, six, and ten per cent.—that is, if there is a sufficient increase in current to provide for a two-per-cent. discount all but the upper terminal spring 18 are bunched together, leaving sufficient resistance 17 in circuit to produce a reading discounted two per cent. If the current increases sufficiently further to a quantity where the consumer is entitled to four per cent. discount, all but the two upper terminal springs 18 are bunched together, thereby including the two upper sections of the resistance 17 in circuit. It will be observed that the solenoid 19 constitutes a unitary electromagnetic means for changing the resistance 17.

I desirably vary the magnetizing effect of the coil 15 upon the armature by the method disclosed; but I do not wish to be limited to this method. In my application, Serial No. 68,751, filed July 18, 1901, I have broadly claimed the supplemental pressure-coil 15, as herein shown.

While I have herein shown and particularly described the preferred embodiment of my invention, I do not wish to limit myself to the precise construction and arrangement as herein shown and particularly described; but,

Having thus described my invention, I claim as new and desire to secure by Letters Patent—

1. The combination with a system of electrical distribution, of a meter for measuring the load thereof, step-by-step operating means for changing the rate of operation of the measuring element of the meter per unit of load or energy, and unitary electromagnetic means for operating the aforesaid means step by step to decrease the rate of operation of the said measuring mechanism upon an increase in current of the system, substantially as described.

2. The combination with a system of electrical distribution, of a commutated motor-meter for measuring the load thereof, a resistance divided into sections, an electromagnetic mechanism supplied with current from the system serving to include sections of the resistance in series with the armature upon an increase in the current and to shunt the said resistance from the armature-circuit upon a decrease in the current, whereby the measuring mechanism of the meter may be operated at a fluctuating rate per unit of load or energy by a fluctuating current, substantially as described.

3. The combination with a system of electrical distribution, of a meter for measuring the load thereof, step-by-step operating means for changing the rate of operation of the measuring element of the meter per unit of load or energy, unitary electromagnetic means for operating the aforesaid means step by step to decrease the rate of operation of the said measuring mechanism upon an increase in current of the system, and means for preventing a decreased rate of operation of the measuring mechanism per unit of load or energy until the current has reached a predetermined value, substantially as described.

4. The combination with a system of electrical distribution, of a commutated motor-meter for measuring the load thereof, a resistance divided into sections, an electromagnetic mechanism supplied with current from the system serving to include sections of the resistance in series with the armature upon an increase in the current and to shunt the said resistance from the armature-circuit upon a decrease in the current, whereby the measuring mechanism of the meter may be operated at a fluctuating rate per unit of load or energy by a fluctuating current, and means for preventing the decreased rate of operation of the measuring mechanism per unit of load or energy until the current has reached a predetermined value, substantially as described.

5. The combination with a system of electrical distribution, of a meter receiving current therefrom, an adjusting prediscount resistance in circuit with a winding of the meter to adjust the rate of speed of the measuring mechanism per unit of load or energy, and means for varying the number of effective turns of the said winding to secure its proper magnetizing effect, substantially as described.

6. The combination with a system of electrical distribution, of a meter receiving current therefrom, an adjusting prediscount resistance in series with a winding of the meter to adjust the rate of speed of the measuring mechanism per unit of load or energy, and means for varying the number of effective turns of the said winding to secure its proper magnetizing effect, substantially as described.

7. The combination with a system of electrical distribution, of a meter receiving current therefrom, the said meter being provided with an auxiliary field-winding for producing starting torque, an adjusting prediscount resistance in circuit with another meter-winding and in series with the said auxiliary winding to adjust the rate of speed of the measuring mechanism per unit of load or energy, and means for varying the number of effective turns of the said auxiliary winding to secure its proper magnetizing effect, substantially as described.

8. The combination with a system of electrical distribution, of a meter receiving current therefrom, the said meter being provided with an auxiliary field-winding for producing starting torque, an adjusting prediscount resistance in series with said auxiliary winding and another meter-winding to adjust the rate of speed of the measuring mechanism per unit of load or energy, and means for varying the number of effective turns of the said auxiliary winding to secure its proper magnetizing effect, substantially as described.

9. The combination with a system of electrical distribution, of a commutated motor-meter receiving current therefrom, the said meter being provided with an auxiliary field-winding for producing starting torque, an adjusting prediscount resistance in circuit with the armature and in series with the said auxiliary winding to adjust the rate of speed of the measuring mechanism per unit of load or energy, and means for varying the number of effective turns of the said auxiliary winding to secure its proper magnetizing effect, substantially as described.

10. The combination with a system of electrical distribution, of a commutated motor-meter receiving current therefrom, the said meter being provided with an auxiliary field-winding for producing starting torque, an adjusting prediscount resistance in series with the armature and the said auxiliary field-winding to adjust the rate of speed of the measuring mechanism per unit of load or energy, and means for varying the number of effective turns of the said auxiliary winding to secure its proper magnetizing effect, substantially as described.

11. The combination with a system of electrical distribution, of a meter for measuring the load thereof, a resistance divided into sections, an electromagnetic mechanism supplied with current from the system serving to include sections of the resistance in series with the armature upon an increase in the current and to shunt the said resistance from the armature-circuit upon a decrease in the current, whereby the measuring mechanism of the meter may be operated at a fluctuating rate per unit of load or energy by a fluctuating current, substantially as described.

12. In an electric meter, the combination with step-by-step means for changing the rate of operation of the measuring element of the meter per unit of load or energy, of unitary electromagnetic step-by-step operating means for operating the aforesaid means step by step to decrease the rate of operation of the said measuring mechanism upon an increase in the current measured, substantially as described.

13. In an electric meter, the combination with motor members therefor, of a commutator, resistances divided into sections, an electromagnet supplied with current from the system serving to include sections of the resistance in series with the armature upon an increase in the current and to shunt the said resistance from the armature-circuit upon a decrease in the current, whereby the measuring mechanism of the meter may be operated at a fluctuating rate per unit of load or energy by a fluctuating current, substantially as described.

14. In an electric meter, the combination with step-by-step means for changing the rate of operation of the measuring element of the meter per unit of load or energy, of unitary electromagnetic step-by-step operating means for operating the aforesaid means step by step to decrease the rate of operation of the said measuring mechanism upon an increase in the current of the system, and means for preventing the decreased rate of operation of the measuring mechanism per unit of load or energy until the current has reached a predetermined value, substantially as described.

15. The combination with a system of electrical distribution, of a meter receiving current therefrom, an adjusting prediscount resistance in circuit with a field-winding of the meter to adjust the rate of speed of the measuring mechanism per unit of load or energy, and means for varying the magnetic influence of the said winding, substantially as described.

16. The combination with a system of electrical distribution, of a meter receiving current therefrom, an adjusting prediscount resistance in series with a field-winding of the meter to adjust the rate of speed of the measuring mechanism per unit of load or energy, and means for varying the magnetic influence of the said winding, substantially as described.

17. The combination with a system of electrical distribution, of a meter receiving current therefrom, the said meter being provided with an auxiliary field-winding for producing starting torque, an adjusting prediscount resistance in circuit with another meter-winding and in circuit with the said auxiliary winding to adjust the rate of speed of the measuring mechanism per unit of load or energy, and means for varying the magnetic influence of the said auxiliary winding, substantially as described.

18. The combination with a system of electrical distribution, of a meter receiving current therefrom, the said meter being provided with an auxiliary field-winding for producing starting torque, an adjusting prediscount resistance in series with said auxiliary winding and another meter-winding, to adjust the rate of speed of the measuring mechanism per unit of load or energy, and means for varying the magnetic influence of the said auxiliary winding, substantially as described.

19. The combination with a system of electrical distribution, of a commutated motor-meter receiving current therefrom, the said meter being provided with an auxiliary field-winding for producing starting torque, an adjusting prediscount resistance in circuit with the armature and in series with the said auxiliary winding to adjust the rate of speed of the measuring mechanism per unit of load or energy, and means for varying the magnetic influence of the said auxiliary winding, substantially as described.

20. The combination with a system of electrical distribution, of a commutated motor-meter receiving current therefrom, the said meter being provided with an auxiliary field-winding for producing starting torque, an adjusting prediscount resistance in series with the armature and the said auxiliary field-winding, to adjust the rate of speed of the measuring mechanism per unit of load or energy, and means for varying the magnetic influence of the said auxiliary winding, substantially as described.

In witness whereof I hereunto subscribe my name this 23d day of May, A. D. 1901.

THOMAS DUNCAN.

Witnesses:
GEORGE L. CRAGG,
HERBERT F. OBERGFELL